(12) United States Patent
Dalloro et al.

(10) Patent No.: US 11,423,189 B2
(45) Date of Patent: Aug. 23, 2022

(54) SYSTEM FOR AUTOMATED GENERATIVE DESIGN SYNTHESIS USING DATA FROM DESIGN TOOLS AND KNOWLEDGE FROM A DIGITAL TWIN

(71) Applicant: Siemens Aktiengesellschaft, Munich (DE)

(72) Inventors: Livio Dalloro, Plainsboro, NJ (US); Edward Slavin, III, Robbinsville, NJ (US); Sanjeev Srivastava, Princeton Junction, NJ (US); Lucia Mirabella, Plainsboro, NJ (US); Suraj Ravi Musuvathy, Princeton Junction, NJ (US); Arquimedes Martinez Canedo, Plainsboro, NJ (US); Erhan Arisoy, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 265 days.

(21) Appl. No.: 16/496,678

(22) PCT Filed: Mar. 27, 2018

(86) PCT No.: PCT/US2018/024490
§ 371 (c)(1),
(2) Date: Sep. 23, 2019

(87) PCT Pub. No.: WO2018/183275
PCT Pub. Date: Oct. 4, 2018

(65) Prior Publication Data
US 2021/0110075 A1 Apr. 15, 2021

Related U.S. Application Data

(60) Provisional application No. 62/476,961, filed on Mar. 27, 2017.

(51) Int. Cl.
*G06F 30/12* (2020.01)
*G06F 111/04* (2020.01)

(52) U.S. Cl.
CPC .......... *G06F 30/12* (2020.01); *G06F 2111/04* (2020.01)

(58) Field of Classification Search
CPC ..................................................... G06F 30/12
(Continued)

(56) References Cited

U.S. PATENT DOCUMENTS 5,822,206 A 10/1998 Sebastian et al.
9,424,528 B2 8/2016 Kaushal et al.
(Continued)

FOREIGN PATENT DOCUMENTS

JP 2002197122 A 7/2002
JP 2013518449 A 5/2013

OTHER PUBLICATIONS

Japanese Report of Exam dated Dec. 22, 2020; Application No. 2019-552988; 12 pages.
International Search Report dated Jun. 26, 2018; International Application No. PCT/US2018/024490; Filing Date: Mar. 27, 2018; 17 pages.
(Continued)

*Primary Examiner* — Eric D Lee (57) ABSTRACT

A system for autonomous generative design in a system having a digital twin graph a requirements distillation tool for receiving requirements documents of a system in human-readable format and importing useful information contained in the requirements documents into the digital twin graph, and a synthesis and analysis tool in communication with the digital twin graph, wherein the synthesis and analysis tool generates a set of design alternatives based on the captured interactions of the user with the design tool and the imported useful information from the requirements documents. The system may include includes a design tool with an observer for capturing interactions of a user with the design tool, In (Continued)

addition to the observer, an insighter in communication with the design tool and with the digital twin graph receives design alternatives from the digital twin graph and present the receive design alternatives to a user via design tool.

19 Claims, 6 Drawing Sheets

(58) Field of Classification Search
USPC .......................................................... 716/104
See application file for complete search history.

(56) References Cited

U.S. PATENT DOCUMENTS

2016/0188675 A1   6/2016  Vossler
2016/0247129 A1*  8/2016  Song ...................... G06Q 10/20
2018/0137219 A1*  5/2018  Goldfarb ................ G06N 20/00

OTHER PUBLICATIONS

Nicolai T et al.: "The Web of augmented physical objects", International Conference on Mobile Busi,, Jul. 11, 2005 (Jul. 11, 2005), pp. 340-346, XP009089663.

Moreno Aitor et al: "Virtualisation process of a sheet metal punching machine within the Industry 4.0 vision", International Journal on Interactive Design and Manufacturing (IJIDEM), Springer Paris, Paris, vol. 11, No. 2, Jun. 6, 2016 (Jun. 6, 2016), pp. 365-373, XP036227212.

* cited by examiner

SYSTEM FOR AUTOMATED GENERATIVE DESIGN SYNTHESIS USING DATA FROM DESIGN TOOLS AND KNOWLEDGE FROM A DIGITAL TWIN

CROSS-REFERENCE TO RELATED APPLICATIONS

This application is a national phase filing under 35 U.S.C. § 371 of International Patent Application No. PCT/US2018/024490, filed Mar. 27, 2018, which claims priority to U.S. Provisional Patent Application Ser. No. 62/476,961, filed Mar. 27, 2017, entitled, "System for Automated Generative Design Synthesis Using Data from Design Tools and Knowledge from a Digital Twin", which are incorporated herein by reference in their entirety.

TECHNICAL FIELD

This application relates to design of systems. More particularly, the application relates to a system of generative design aided by a digital twin.

BACKGROUND

Designing a complex system, such as a gas turbine, automobile or aircraft requires a substantial amount of manual effort. Computer-aided design (CAD) software has provided some relief providing computer-based efficiencies. For example, CAD systems have made it possible to create and analyze detailed virtual models of systems and their constituent parts and assemblies. CAD systems may also digitally simulate the performance and behavior of the parts and assemblies. Computer aided systems may also generate manufacturing plans and instructions for the production of parts and systems. CAD systems may further assist in managing design related information in digital form over the lifecycle of the produce and provide information to aid in collaborative product development.

Despite the advances of computer aided processes, many engineering tasks still require manual intervention and are tedious and time-consuming. Moreover, domain expertise is tied up in human capital, requiring experts with many years of experience to be present and available to generate design variants, setup analysis models, interpret results, fine tune design parameters to meet design requirements and create suitable manufacturing process plans. Automated engineering systems are desired that fulfill the above identified needs and reduce the burden of requiring human knowledge experts, while providing improved and sophisticated designs that may have gone unrealized due to budget constraints associated with manual systems.

SUMMARY

A system for autonomous generative design in a system having a digital twin graph includes a design tool with an observer for capturing interactions of a user with the design tool, the design tool in communication with the digital twin graph, a requirements distillation tool for receiving requirements documents of a system in human-readable format and importing useful information contained in the requirements documents into the digital twin graph, and a synthesis and analysis tool in communication with the digital twin graph, wherein the synthesis and analysis tool generates a set of design alternatives based on the captured interactions of the user with the design tool and the imported useful information from the requirements documents. The system further includes an observer within the design tool in communication with the digital twin that captures time series of user interactions with the design tool and communicates the user interactions with the digital twin graph. In addition to the observer, an insighter in communication with the design tool and with the digital twin graph receives design alternatives from the digital twin graph and presents the received design alternatives to a user via a design tool.

According to embodiments of a generative design system, a requirements distiller in communication with the digital twin graph receives requirements documents in human-readable format and extracts useful information from the requirements documents for importation into the digital twin graph. The requirements distiller performs the steps of receiving requirements documents in human-readable form, converting the human-readable documents into a digital form, analyzing the digital documents to identify data contained in the documents, compressing the data contained in the documents to extract meaningful information from the data in the requirements documents, and importing the meaningful information into the digital twin graph.

Autonomous generative design systems according to embodiments herein include a synthesis and analysis tool. The synthesis and analysis tool includes an alternatives generator for generating a set of design alternatives based on requirements and relationships between components of the system represented by the digital twin graph, a quantification verifier for verifying each design alternative based on the requirements and design constraints contained in the requirements documents, and a causal explorer for identifying design workflows to identify design and engineering practices. A causal explorer creates a recommended sequence of operations for a user based on the identified design workflows and presents the recommended sequence of operations to the user through the design tool. The system may include a product in use (PIU) data distiller in communication with the digital twin graph, the PIU data distiller receiving operations data from a physical system represented in the digital twin graph and extracting useful information for importation to the digital twin graph. In some embodiments, the PIU data distiller performs the steps of receiving requirements documents in human-readable form, converting the human-readable documents into a digital form, analyzing the digital documents to identify data contained in the documents, compressing the data contained in the documents to extract meaningful information from the data in the requirements documents, and importing the meaningful information into the digital twin graph.

According to a method of autonomous generative design in a system including a digital twin graph requirements documents are distilled to useful information relating to requirement and importing the useful information into the digital twin graph, interactions between a user and a design tool are captured and imported into the digital twin graph, a set of design alternatives based on the useful information of the requirements documents are synthesized and each design alternative in the set of design alternatives is verified against the useful information of the requirements documents, design alternatives are quantified based on certain metrics and a selected design alternative of the set of design alternatives is suggested to the user. The method may further include analyzing each design alternative in the set of design alternatives by performing a simulation for each design alternative in the set of design alternatives and choosing the selected design alternative based on the analysis and the quantified metrics.

According to some embodiments, a design tool receives commands from a user representative of a design operation. The synthesis and analysis tool generates a suggested design operation based on an analysis of the set of design alternatives and providing the suggested design operation to the user. The user may provide instructions to the design tool and alternately, the synthesis and analysis tool generates a suggested design operation and presenting the suggested design operation to the user and repeating this step until the design process is complete.

According to some embodiments, distilling the requirements documents may include receiving requirements documents in human-readable form, converting the human-readable documents into a digital form, analyzing the digital documents to identify data contained in the documents, compressing the data contained in the documents to extract meaningful information from the data in the requirements documents, and importing the meaningful information into the digital twin graph.

According to embodiments, the method may further include importing product in use data relating to operations of a physical system represented in the digital twin graph, to the digital twin graph for use in generating the set of design alternatives.

According to another embodiment of a method for autonomous generative design of a system having a digital twin graph information from requirements documents is imported into the digital twin, user interactions with a software design tool are captured and imported into the digital twin graph, a set of design alternatives are synthesized based on the imported user interactions and the imported requirements information, the system is simulated in the digital twin graph for each of the set of design alternatives, and an optimal design alternative is selected based on the simulations. Data from the requirements documents is distilled from the documents by performing the steps of receiving requirements documents in human-readable form, converting the human-readable documents into a digital form, analyzing the digital documents to identify data contained in the documents, compressing the data contained in the documents to extract meaningful information from the data in the requirements documents, and importing the meaningful information into the digital twin graph. In a synthesis and analysis tool, a set of design alternatives is generated based on semantic information represented in the digital twin graph, each of the design alternatives is verified against the requirements information, design operations corresponding to captured interactions between a human user and a software design tool are identified, and a simulation is run in the digital twin graph for each of the design alternatives. A design operation is selected for performing an optimal design alternative based on a quantification verification, which may be performed through simulation or machine-learning techniques, by way of non-limiting example. In an embodiment, product in use information from a physical system represented by the digital twin graph is imported into the digital twin graph for use in the simulating of the system.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Capturing the engineering knowledge present in this human capital in a digital knowledge base, augmenting it with data and process history, and combining it with operational data is key to unlocking powerful digital engineering system that can automatically generate design alternatives and learn over time to fulfill the goal of "right the first time". Automated systems are desired not only reduce burden on OEMs, but also create better and more sophisticated designs that may not have been considered due to limited budgets.

A digital twin provides a virtual copy of a real-world system. Each component of the system is modeled. To capture additional aspects of the system, relationships between the components and between components and the environment may also be modeled in the digital twin. Due to the identification and modeling of relationships in the system, the digital twin lends itself to representation as a graph containing nodes that define components of the system, with edges connecting the nodes to represent relationships. As the system operates, it generates data that is imported to the digital twin graph to better inform the modeled relationships and components. Past engineering decisions are captured and the lessons learned from these implementations become part of the analysis history of the digital twin.

The digital twin collects and analyzes manufacturing and operation data. It is desirable to augment the digital twin with data from and user interactions with the engineering design tools, and to leverage the data and knowledge in the digital twin to synthesize novel designs with improved characteristics (better performance, longer lasting, lower cost to manufacture, etc.) Today, most of the design data and knowledge is captured through experienced engineers. A subset of this is stored in technical reports and documents readable by humans, but most is not in a form that could be consumed by automated digital systems. They are not in a form that could be used in analytics systems. Design requirements and targets are specified only in natural language in many cases. Domain experts create "design philosophy" documents to store knowledge and intelligence regarding specific design strategies. Design exploration results along with simulation analysis data is summarized and stored in design review documents. These documents are then used to inform future design iterations or variations. Detailed digital models (3D, CAD, CAE, drawings) are also stored. Manufacturing and operational data are increasingly captured, but typically in different systems, and rarely linked back to engineering data in any meaningful way. User interactions and decisions that engineers take to instantiate particular design features are not recorded. None of this information is used in an automated way to intelligently guide the synthesis of new designs.

Embodiments of the present disclosure focus on capturing and relating engineering data and processes, design engineer experience, manufacturing and operational data, and uncertain knowledge about the environment in a "digital twin", and using it to create a new paradigm in design exploration, where the designer focuses on the design problem definition and exploration with the design tools automatically searching the design space and steering the designers toward optimal solutions that fulfill their problem definition. The design tool continuously learns from the domain expert's preferences, the engineer's interactions with the design tool, in addition to knowledge from the product data in the digital twin to improve design exploration strategies and suggest new and improved design variants. The design tool then automatically generates the digital description of the design including geometry, material and other attributes required to manufacture it. The design tool constantly generates a series of design alternatives together with the CAE physics models and analysis data necessary to validate these alternatives against the proposed design goal, interpret the results, and summarize the information to the designer in order to steer him/her in an optimal direction. Finally, the design tool automatically generates a suitable manufacturing process plan.

The proposed design system enables fully automated design instead of today's manual iterative process. It enables exploration of vast design spaces efficiently and finds suitable designs that satisfy a variety of conflicting requirements and constraints. By leveraging domain knowledge captured in the digital twin, it enables non-expert but skilled engineers to synthesize valid designs quickly, transferring the knowledge and experience of the engineers into digital information that remains the property of an organization longer than its human capital. Furthermore, it enables discovering revolutionary new designs that offer better performance than the engineered designs.

A digital twin is a digital representation of one or more physical objects. Using a digital twin, the entire lifecycle from design to de-commissioning can be simulated and observed in a virtualized environment. As the Internet of Things (IoT) as developed, the use of digital twins has increased as the availability of data for modeling the physical system has increased, making the implementation of a digital twin model become practicable. The digital twin may be in communication with an associated physical system and receives real-time data streams from the physical environment and processes the real-time data to predict various operating states of the physical objects based on prognostic features found within the received data. Through artificial intelligence and other processing techniques, a digital twin provides understanding, learning and reasoning regarding the physical system it represents.

Computer aided design (CAD) tools use computer systems or workstations to create, modify, analyze and optimize a design of an object or system. CAD systems provide outputs that include printable output that may be read by humans, or digital outputs that may provide operating instructions for machines or manufacturing controls for implementing the design. The CAD output will convey information such as materials, processes, dimensions and tolerances. CAD software provides a graphical user interface (GUI) to the user allowing the design engineer to produce various geometric shapes that can be controlled with respect to size, orientation and perspective with respect to other geometric objects. The designer may create an initial design or create modifications based on the specifications or design requirements, or optimizations based on observations of a design during operations. As the operator navigates the CAD software, a sequence of user actions is created. A time-series of user actions may be grouped into patterns where a pattern represents a responsive action to a design objective. These patterns may be considered representative of the human knowledge that was required to identify a need for the action, and the manner in which the action was carried out.

According to embodiments of systems and methods for automated generative design using a digital twin described herein, the power of a digital twin is augmented with captured human knowledge and design requirements to allow the learning and reasoning capability of the digital twin to produce novel design alternatives. The design alternatives generated by the digital twin may be verified ranked against the requirements to ensure compliance.

Figure 1:
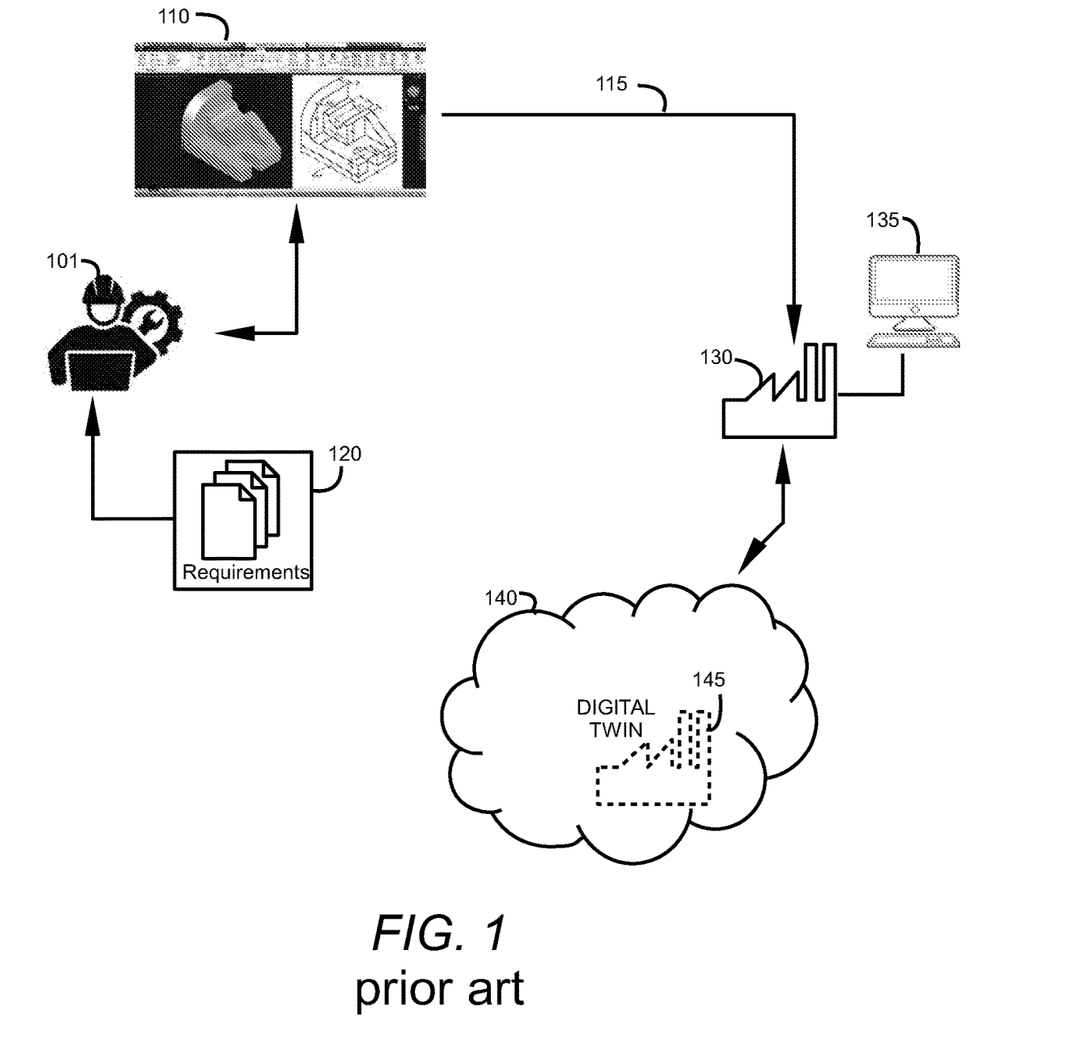
FIG. 1 is a block diagram of a prior art system using a digital twin.

FIG. 1 is a block diagram of a conventional design system for an industrial system. The industrial system includes a physical presence 130 that performs the industrial function. The physical presence 130 may include physical components, such as robots, machines, conveyor systems and transport vehicles by way of example. Other components that support or control the physical components such as sensors and actuators may also be included in the physical presence 130. A control system 135 is provided which receives data inputs from the physical components and performs logic operations based on the received inputs. The control system 135 may produce outputs based on results of the logic operations. The outputs may include control signals to control operation of the industrial system. The outputs may include sounding alarms for conditions that are out of tolerance, such as a high temperature alarm, or may include control signals for operating a system control. For example, in response to a high temperature, an output signal may operate a valve to control flow of coolant to mitigate excessive temperatures.

The physical objects making up the industrial system are typically designed by engineers 101. The engineer 101 works with a computer aided design tool 110 to produce a design alternative for a component of the industrial system. The design tool may provide the engineer 101 with feedback relating to a design, such as geometric constraints, or strength versus weight considerations based on a proposed design. The engineer 101 produces the design alternatives at least in part using requirements documentation 120. The requirements 120 are produced in a human-readable format to provide information to the engineer 101 regarding the required functionality and characteristics of the component being designed.

The engineer's 101 designs are output from the design tool 110 and provided 115 to the physical system (e.g. the factory) 130 to produce the design. In other embodiments, it may be the physical system 130 itself, or some portion thereof, that is the subject of the engineer's design. Once the physical system is established, each aspect of the system is modeled as a virtual copy in a digital twin 140. The models are combined to create an overall virtual model 145 that is a digitalized copy (or twin) of the physical system 130. The digital twin 145 runs simulations of the physical system 130, while operations are being performed. The digital twin 145 may receive updates as to various states of the components of the physical system 130 as it runs. The digital twin 145 uses the updated information from the system for updating and running future simulations.

The digital twin may also use artificial intelligence techniques to identify potential problems or inefficiencies in the system. When an improvement is suggested, the digital twin 145 may provide information to the physical system 130 or the control system 135 to make adjustments to improve efficiency, or to provide warnings or notices that a potential failure is imminent. As may be seen in FIG. 1, the design process involving the design tool 110 and the engineer 101 is manual and operates separately and independently of the digital twin 145. While the digital twin 145 may provide helpful information, it must be received and interpreted by human capital to be implemented. Further potential design alternatives are limited to the knowledge and experience of the engineer involved.

Figure 2:
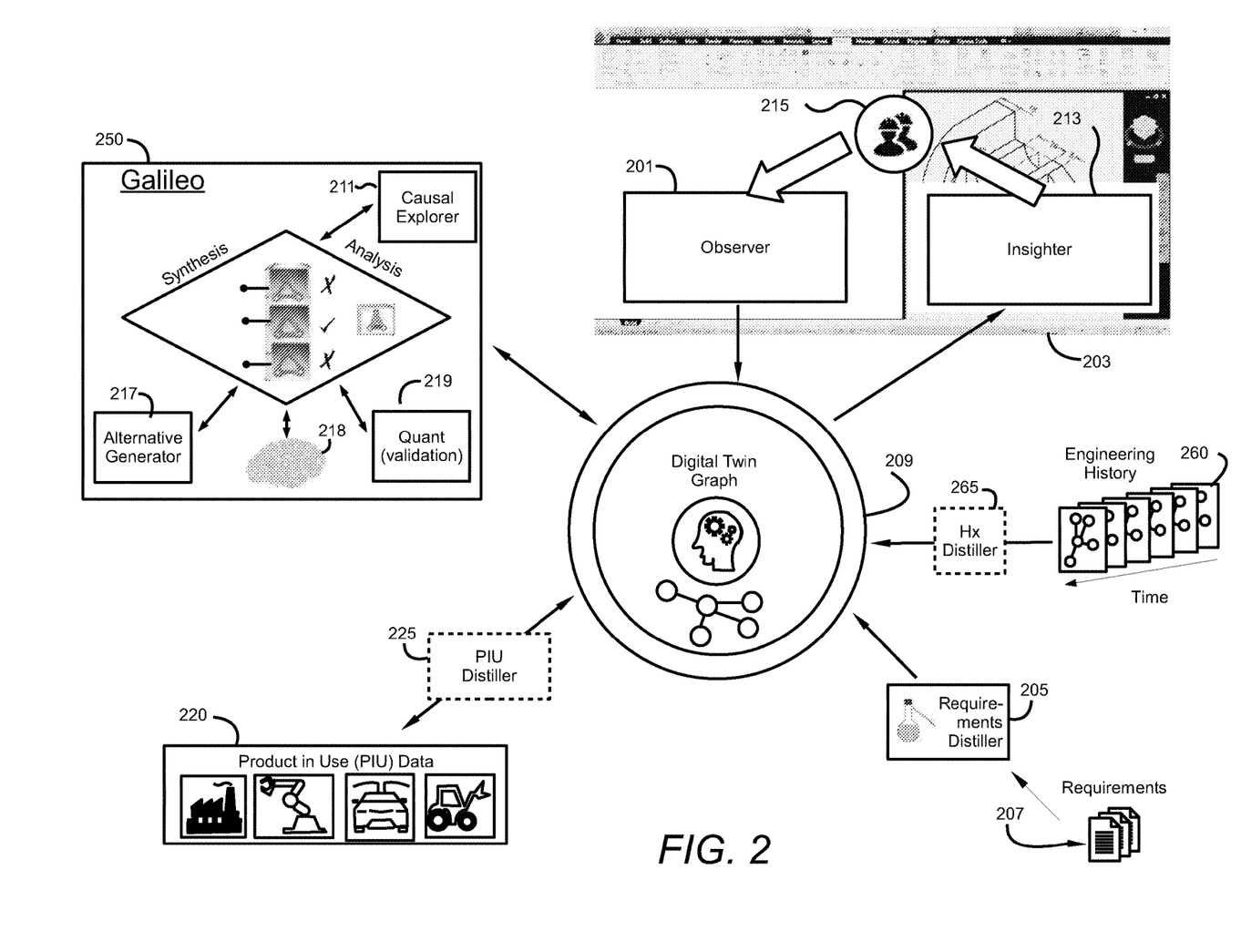
FIG. 2 is a block diagram of an autonomous generative design system based on a digital twin according to embodiments of the present disclosure.
Figure 3:
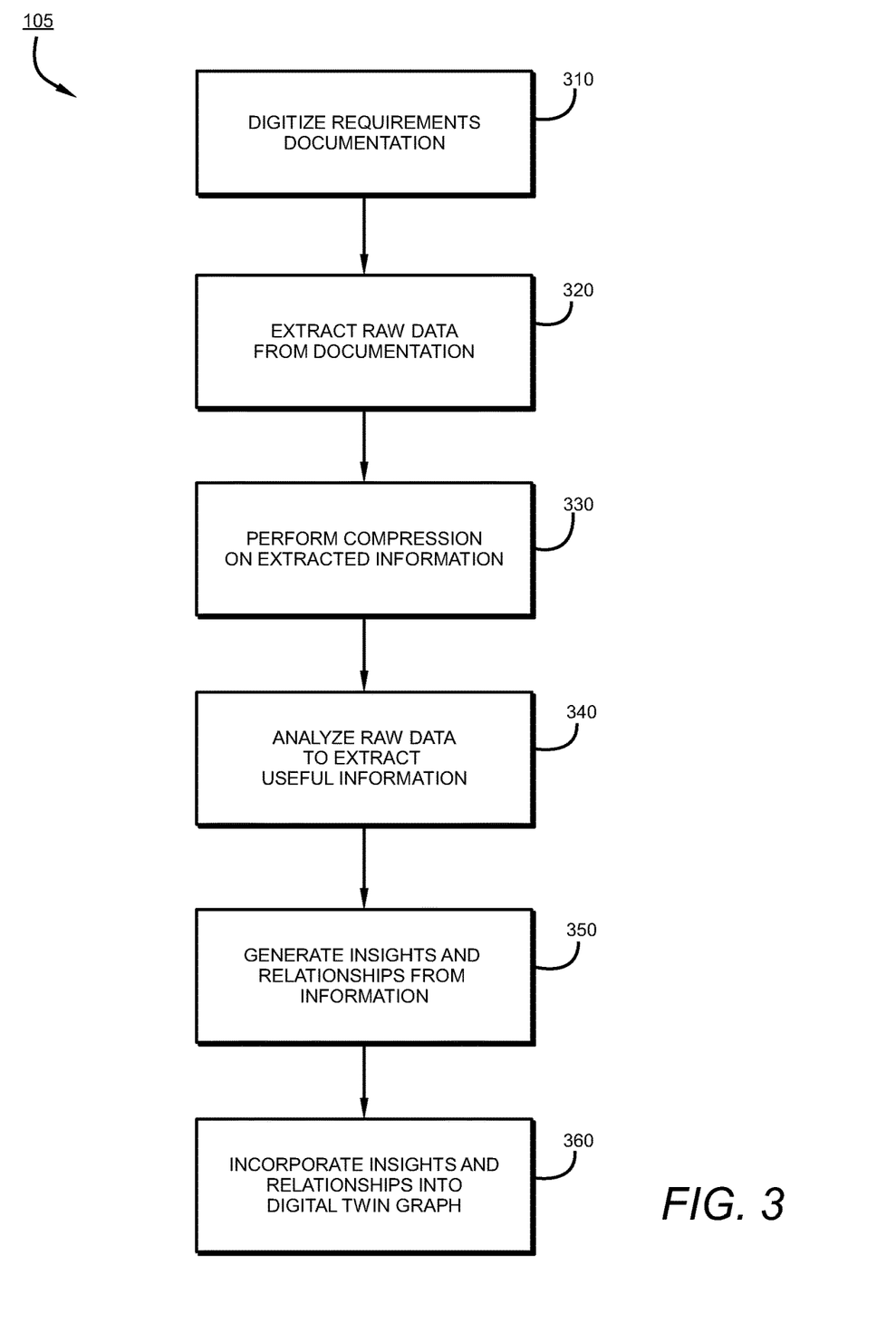
FIG. 3 is a process flow diagram of a method for distilling requirements documentation and product in use data for use in a digital twin graph according to embodiments of the present disclosure.

Referring now to FIG. 2, a system for autonomous generative design using a digital twin is shown. A digital twin based on a digital twin graph 209. The digital twin graph 209 includes semantic information about the system and includes causal relationship between system components. The digital twin graph 209 may use artificial intelligence techniques to identify additional relationships and create insights from subtle interactions between components in the system. Design requirements 207 are produced in human-readable format. A requirements distiller 205 receives the design documents 207 and digitizes the documents 207 and extracts the useful information from the documents, allowing the useful information to be integrated into the digital twin graph 209.

During operation of the system, data is continuously generated. The information may be measured and captured by sensors placed throughout the system. This information may be referred to as production in use (PIU) data 220. This information 220 may be provided to the digital twin graph 209. The digital twin graph 209 uses the PIU data 220 to simulate operation of the physical system. Based on the simulation, feedback about the state of operations may be provided back to the physical system. In some embodiments, the PIU data 220 may be processed by a PIU distiller 225 to condition and process the PIU data to extract the most useful production data and put it into a form that is best consumed by the digital twin graph 209.

A design tool 203 provides a GUI between the tool and a user (e.g. a design engineer) 215. The engineer 215 interacts with the design tool 203 by performing software function or commands to carry out the design process. The system of FIG. 2 includes an observer function 201. The observer 201 anonymously monitors and records the interactions of the engineer 215 with the design tool 203. The interactions may be captured as time-series of actions performed by the engineer 215. Patterns comprising a series of actions may be identified as an action or reaction of an engineer to a given condition. For example, to reduce weight, a surface of an object may be created as a lattice, or unnecessary areas of mass may be shaved or eliminated. The observer 201 can capture the actions of the engineer, to learn how the engineer responds to the objective of reducing weight. In this way, the observer 201 extracts the engineer's 215 knowledge, which can be stored and recalled in a digitized form. Through the observer 201, the system can capture and recall the collective knowledge of the engineers 215 that have used the design tool 203. Using the observer 201 in combination with the design tool 203 approaches more autonomous generative design by addressing the problem of knowledge being locked into human capital. By capturing the actions of experienced engineers and extracting useful knowledge or information from these actions, this knowledge may be used to augment a digital twin graph 209 to provide generative design alternatives responsive to requirements, and the semantic relationships contained in the physical system.

The design tool 203 also includes an insighter function 213 to aid in communication to the user between the digital twin graph 209 and the design tool 203. During the design process, the system generates design alternatives or provides alterations to a user's input captured through the observer 201. The insighter 203 receives suggestions from the digital twin graph 209 and provides feedback regarding the suggestions to the engineer 215.

Central to the autonomous generative design system of FIG. 2 is the synthesis and analysis of design alternatives in view of the digital twin represented in the digital twin graph 209. The sub-system for providing synthesis and analysis is referred to throughout this description as "Galileo" 250. Galileo 250 is in communication with the digital twin graph 209 and gains access to the requirements 207, production in use data 220 and design tool 203 information via the digital twin graph 209. This is performed using a combination of simulation and data driven methods such as machine learning. Galileo 250 includes a learning and reasoning module 218. The learning and reasoning module 218 employs artificial intelligence to synthesize design alternative in the alternative generator 217. A quantification (quant) function 219 takes the design alternatives created by the alternative generator 217, verifies the design alternative against the requirements 207 which are stored and represented in the digital twin graph 209, and computes certain metrics to quantify the quality of each design alternative. Once a design alternative is verified, it may be simulated with the aid of the digital twin graph 209. A causal explorer 211 provides tools to record the evolution of design workflows within the digital twin graph 209 and can identify causal links representing recurring design and engineering practices, such as when the same problem is attempted to be solved a number of times. In view of the distilled requirements 207, the causal explorer may recommend a sequence of actions to be taken to the engineer 215 by leveraging the past actions within the system, basically making suggestions on problems the system has seen solved before.

In some embodiments of a generative design system, the Galileo system interacts with a user 215 throughout the design process in real-time. As the engineer 215 interacts with the design tool 203, the engineer's actions are captured by the observer 201 and the actions and outputs from the design tool 203 are imported to the digital twin graph 209. The Galileo sub-system 250 analyzes the engineer's 215 most recent actions and analyzes alternative or next-step actions in the design process consistent with the requirements and any other design constraints. Galileo 250 can generate and analyze thousands of possible design alternatives in real-time and provide suggestions back to the user through the insighter 213. The engineer may choose to accept the suggestion of Galileo 250, or the engineer 215 may make a different decision based on the engineer's knowledge and experience. As the design process continues, inputs alternate from the engineer and the Galileo system going back and forth until the design process is complete.

As the system develops over time, the engineering decisions which shaped the system create an engineering history 260. The engineering history 260 is comprised of instances over time. The data contained in the engineering history 260 is distilled in a history distiller 265. Meaningful information is extracted and imported to the digital twin graph 209.

According to another embodiment, Galileo 250 may be used as a stand-alone solution where all of the requirements and constraints along with the captured knowledge from the design tool 203 is used along with the digital twin graph 209 are presented to the Galileo system 250. Through learning and reasoning 218 the alternative generator synthesized a set of design alternatives. Each design alternative is verified and analyzed by the quant 219 against the requirements and constraints. The causal explorer may search the digitized human knowledge collected from the design tool to develop additional design or operational alternatives. The alternatives are analyzed and ranked according to quantified metrics as to acceptability to meet the requirements and meet other operational efficiencies. The Galileo system 250 produces its best solution and presents the solution to the user 215 in the design tool 203 via the insighter 213.

The data contained in each of the engineering history 260, the requirements documentation 207 and the PIU 220, may be used independently of each other to generate design alternatives in the Galileo system 250. Additionally, these data sources may be used in any combination to provide meaningful information to the Galileo system 250 for generating design alternatives based on the digital twin graph 209.

Figure 4:
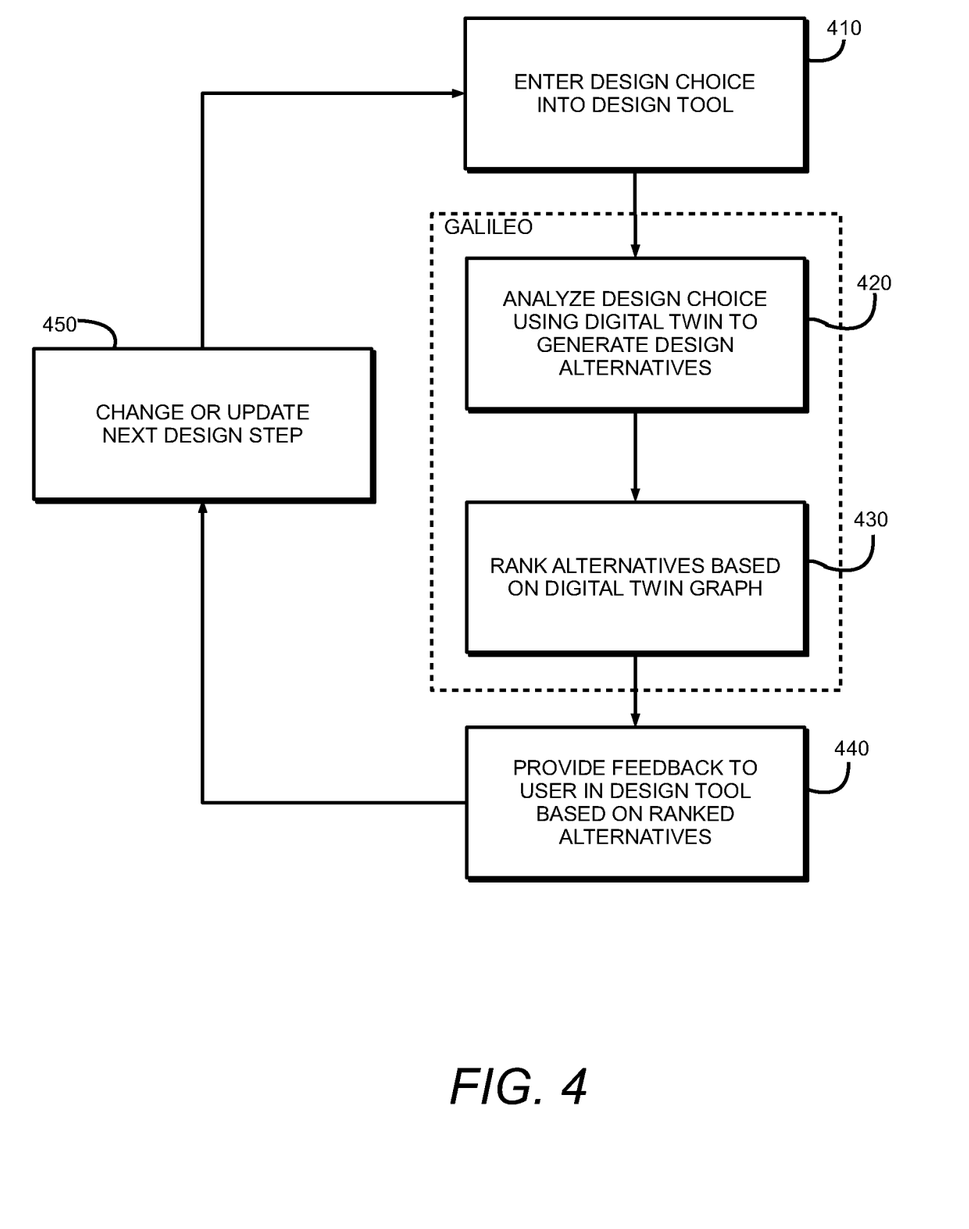
FIG. 4 is a process flow diagram of a method of autonomous generative design according to an embodiment of the present disclosure.

FIG. 4 is a process flow diagram showing the distillation process for receiving requirements and/or PIU data according to embodiments of this disclosure. The requirements are received as human readable documents. The documentation is then digitized 310. For example, a human readable document may be scanned to a digital file which can be read and stored by a computer. Raw data contained in the documents is then extracted 320. The raw data may include words contained in the text of the documentation, and may be extracted by way of example, by perform optical character recognition (OCR) on the electronically captured documents. A form of lossless compression may further be performed on the extracted raw data 330. Compression may include the removal of common or nonce words, leaving behind words or phrasing deemed to contain useful information. The raw data is thus analyzed to extract useful information 340. The useful data is extracted in a form that is readily consumable by the digital twin graph and imported to the digital twin graph. The extracted information is analyzed for insights and semantic information regarding relationships between components of the system 350. The determined semantic meanings and insights are then incorporated into the digital twin graph 360.

Referring now to FIG. 4, a process flow diagram for a method of generative design according to embodiments of this disclosure is shown. A user, for example a design engineer, enters a design choice into a design tool 410. The design choice provided by the user is captured and provided to a digital twin graph. A Galileo system then analyzes the design choice using the digital twin graph to generate additional design alternatives 420. The alternatives generated in the Galileo system are analyzed and ranked using the digital twin graph in view of design specification and constraints 430. Feedback regarding the ranked design alternatives are then provided as feedback to the user 440. Based on the feedback and the current state of the design process, the user may change or update the next design step 450. This process is repeated with the updated next design step 450 being entered into the design tool 410 and the process repeats until the design process is complete.

Figure 5:
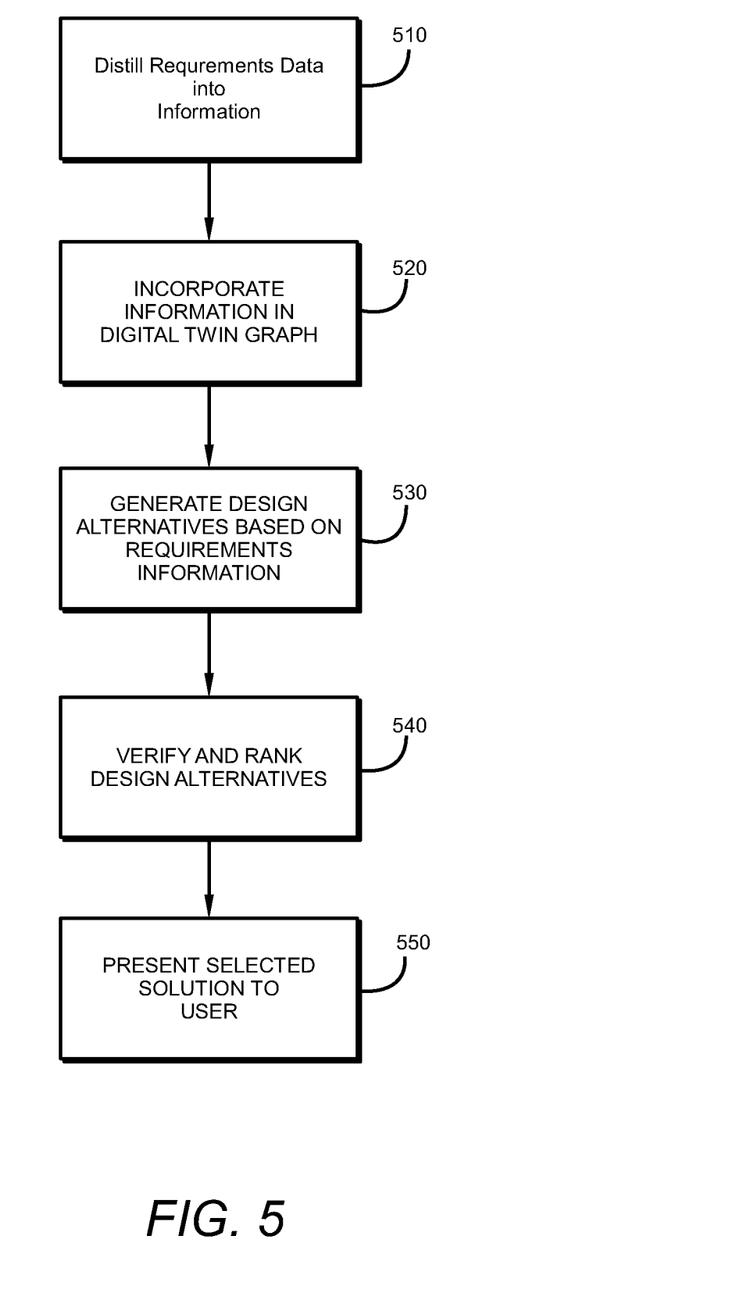
FIG. 5 is a process flow diagram of a method of autonomous generative design according to an embodiment of the present disclosure.

FIG. 5 is a process flow diagram of a method for autonomous design generation according to an embodiment of the present disclosure. Requirements data is distilled and entered into a digital twin graph 510. The information is incorporated into the digital twin graph based on the semantic meanings of the information in the requirements 520. A synthesis and analysis tool in communication with the digital twin graph generates design alternatives based on the requirements information in the digital twin graph 530. The synthesis and analysis tool ranks and verifies each design alternative. A proposed design alternative is selected based on the rankings and is presented to a user 550. The proposed alternative may be presented to the user through a computer-based design tool, by way of example. In some embodiments, multiple design alternatives may be presented, each alternative possessing tradeoffs with respect to the design requirements and constraints.

Figure 6:
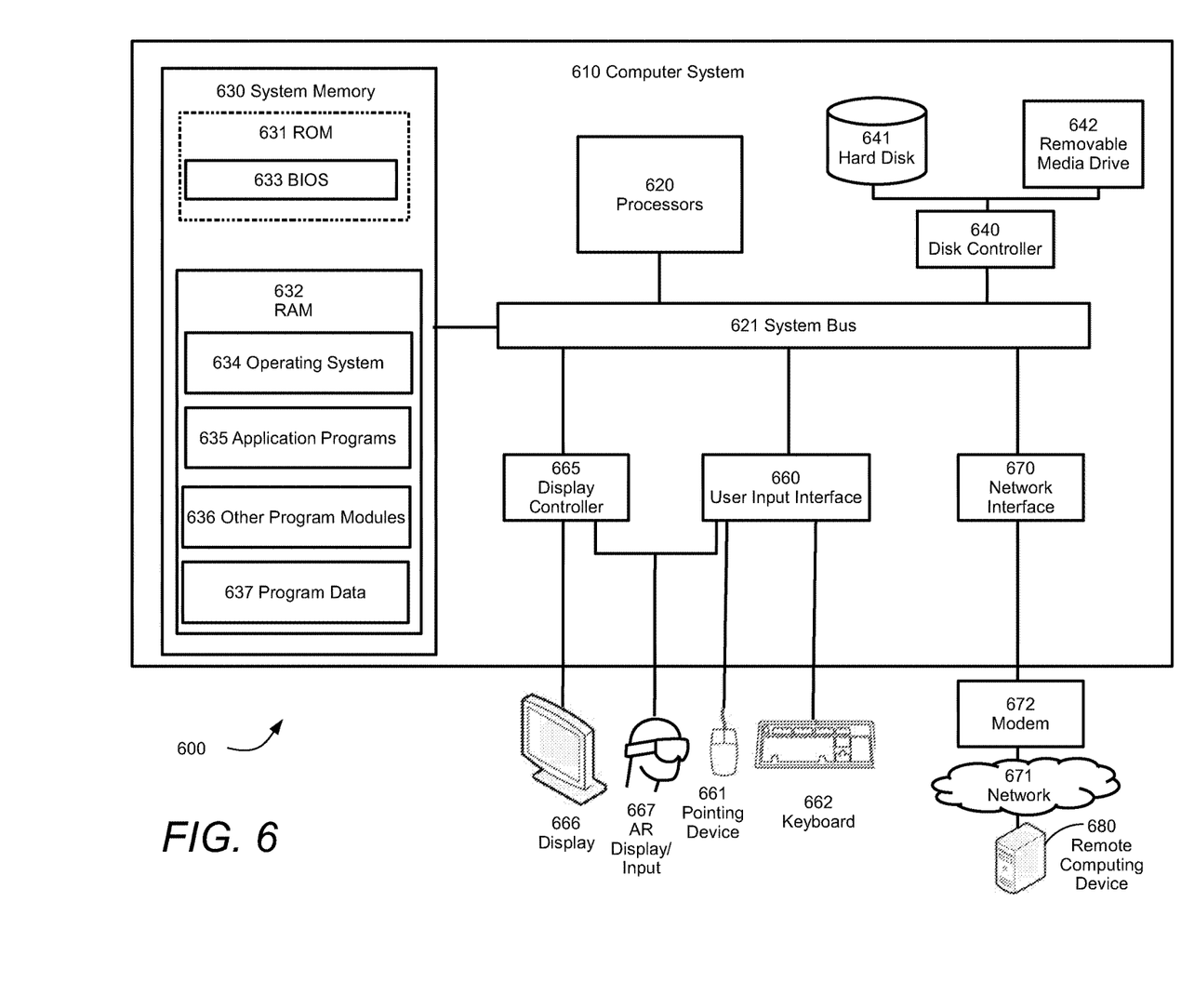
FIG. 6 is a block diagram of a computer system that may be used to implement aspects of embodiments of the present disclosure.

FIG. 6 illustrates an exemplary computing environment 600 within which embodiments of the invention may be implemented. Computers and computing environments, such as computer system 610 and computing environment 600, are known to those of skill in the art and thus are described briefly here.

As shown in FIG. 6, the computer system 610 may include a communication mechanism such as a system bus 621 or other communication mechanism for communicating information within the computer system 610. The computer system 610 further includes one or more processors 620 coupled with the system bus 621 for processing the information.

The processors 620 may include one or more central processing units (CPUs), graphical processing units (CPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general-purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 6, the computer system 610 also includes a system memory 630 coupled to the system bus 621 for storing information and instructions to be executed by processors 620. The system memory 630 may include computer readable storage media in the form of volatile and/or nonvolatile memory, such as read only memory (ROM) 631 and/or random-access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. System memory 630 may additionally include, for example, operating system 634, application programs 635, other program modules 636 and program data 637.

The computer system 610 also includes a disk controller 640 coupled to the system bus 621 to control one or more storage devices for storing information and instructions, such as a magnetic hard disk 641 and a removable media drive 642 (e.g., floppy disk drive, compact disc drive, tape drive, and/or solid-state drive). Storage devices may be added to the computer system 610 using an appropriate device interface (e.g., a small computer system interface (SCSI), integrated device electronics (IDE), Universal Serial Bus (USB), or FireWire).

The computer system 610 may also include a display controller 665 coupled to the system bus 621 to control a display or monitor 666, such as a cathode ray tube (CRT) or liquid crystal display (LCD), for displaying information to a computer user. The computer system includes an input interface 660 and one or more input devices, such as a keyboard 662 and a pointing device 661, for interacting with a computer user and providing information to the processors 620. The pointing device 661, for example, may be a mouse, a light pen, a trackball, or a pointing stick for communicating direction information and command selections to the processors 620 and for controlling cursor movement on the display 666. The display 666 may provide a touch screen interface which allows input to supplement or replace the communication of direction information and command selections by the pointing device 661. In some embodiments, an augmented reality device 667 that is wearable by a user, may provide input/output functionality allowing a user to interact with both a physical and virtual world. The augmented reality device 667 is in communication with the display controller 665 and the user input interface 660 allowing a user to interact with virtual items generated in the augmented reality device 667 by the display controller 665. The user may also provide gestures that are detected by the augmented reality device 667 and transmitted to the user input interface 660 as input signals.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as a magnetic hard disk 641 or a removable media drive 642. The magnetic hard disk 641 may contain one or more datastores and data files used by embodiments of the present invention. Datastore contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

The computing environment 600 may further include the computer system 610 operating in a networked environment using logical connections to one or more remote computers, such as remote computing device 680. Remote computing device 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 680). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671. An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A system for autonomous generative design in a system having a digital twin graph, the system comprising:
    a requirements distillation tool for receiving requirements documents of a system in human-readable format, extracting and importing information relating to a requirement contained in the requirements documents into the digital twin graph;
    a synthesis and analysis tool in communication with the digital twin graph, wherein the synthesis and analysis tool generates and evaluates a set of design alternatives based on information relevant to a design problem contained in the digital twin graph; and
    an observer in communication with a design tool for capturing interactions of a user with the design tool relating to design of the system, wherein the observer captures time series of user interactions, identifies patterns of user interactions as an action or reaction of the user and includes the action or reaction of the user to the digital twin graph.

2. The system of claim 1, further comprising:
    an insighter in communication with the design tool and with the digital twin graph, the insighter configured to receive design alternatives from the digital twin graph and present the received design alternatives to a user via the design tool.

3. The system of claim 1 further comprising:
    a requirements distiller in communication with the digital twin graph, the requirements distiller receiving requirements documents in human-readable format and extracting information relating to a requirement from the requirements documents and importing the information into the digital twin graph.

4. The system of claim 3, wherein the requirements distiller performs the steps of:
    receiving requirements documents in human-readable form;
    converting the human-readable documents into a digital form;
    analyzing the digital documents to identify data contained in the documents;
    compressing the data contained in the documents to extract information related to a requirement from the data in the requirements documents; and
    importing the information into the digital twin graph.

5. The system of claim 1, the synthesis and analysis tool comprising:
    an alternatives generator for generating a set of design alternatives based on requirements and relationships between components of the system represented by the digital twin graph;
    a quantification verifier for verifying each design alternative based on the requirements and design constraints contained in the requirements documents, and computing certain metrics to quantify a quality of a design alternative; and
    a causal explorer for identifying design workflows to identify design and engineering practices.

6. The system of claim 5, wherein the causal explorer creates a recommended sequence of operations for a user based on the identified design workflows.

7. The system of claim 1, further comprising:
    a product in use (PIU) data distiller in communication with the digital twin graph, the PIU data distiller receiving operations data from a physical system represented in the digital twin graph and extracting information for importation to the digital twin graph.

8. The system of claim 7, wherein the PIU data distiller performs the steps of:
    receiving product in use data from components of the system;
    converting the product in use data into a digital form;
    analyzing the digital data to identify information contained in the data;
    compressing the information from the PIU data to extract the information from the PIU data; and
    importing the information into the digital twin graph.

9. The system of claim 1, further comprising:
    an engineering history distiller in communication with the digital twin graph, the engineering history distiller receiving data relating to past engineering design choices and extracting information from the past engineering design choices and importing the information into the digital twin graph.

10. A method of autonomous generative design in a system including a digital twin graph, the method comprising:
    distilling requirements documents to extract information relating to at least one requirement and importing the information into the digital twin graph;
    capturing interactions between a user as a time-series of user actions and a design tool related to design of the system and importing the interactions to the digital twin graph;
    identifying a pattern from the time-series of user actions as an action or reaction of the user and including the action or reaction in the digital twin graph;

synthesizing a set of design alternatives based on the information of the requirements documents and the captured interactions between the user and the design tool;

verifying and quantifying each design alternative in the set of design alternatives against the information of the requirements documents; and suggesting to the user, a selected design alternative of the set of design alternatives.

11. The method of claim 10, further comprising:

analyzing each design alternative in the set of design alternatives by performing a simulation for each design alternative in the set of design alternatives; and choosing the selected design alternative based on the analysis and quantified metrics.

12. The method of claim 10, further comprising:

in a design tool, receiving commands from a user representative of a design operation;

in a synthesis and analysis tool, generating a suggested design operation based on an analysis of the set of design alternatives and providing the suggested design operation to the user; and alternatively receiving commands from the user and generating a suggested design operation and presenting the suggested design operation to the user and repeating this step until the design process is complete.

13. The method of claim 10, wherein distilling the requirements documents comprises:

receiving requirements documents in human-readable form;

converting the human-readable documents into a digital form;

analyzing the digital documents to identify data contained in the documents;

compressing the data contained in the documents to extract information relating to at least one requirement from the data in the requirements documents; and importing the information into the digital twin graph.

14. The method of claim 10, further comprising:

importing product in use data relating to operations of a physical system represented in the digital twin graph, to the digital twin graph for use in generating the set of design alternatives.

15. A method for autonomous generative design of a system having a digital twin graph, comprising:

importing information from requirements documents into the digital twin;

capturing and importing user interactions as a time-series of actions of the user with a software design tool related to design of the system and importing the interactions into the digital twin graph;

identifying a pattern from the time-series of user actions as an action or reaction of the user and including the action or reaction in the digital twin graph;

synthesizing a set of design alternatives based on the imported user interactions and the imported requirements information;

simulating the system in the digital twin graph for each of the set of design alternatives; and selecting an optimal design alternative based on the simulations.

16. The method of claim 15, further comprising:

distilling data from the requirements documents by performing the steps of:

receiving requirements documents in human-readable form;

converting the human-readable documents into a digital form;

analyzing the digital documents to identify data contained in the documents;

compressing the data contained in the documents to extract information relating to at least one requirement from the data in the requirements documents; and importing the information into the digital twin graph.

17. The method of claim 15 further comprising:

in a synthesis and analysis tool:

generating a set of design alternatives based on semantic information represented in the digital twin graph;

verifying each of the design alternatives against the requirements information;

identifying design operations corresponding to captured interactions between a human user and a software design tool; and running a simulation in the digital twin graph for each of the design alternatives.

18. The method of claim 17 further comprising:

selecting a design operation for performing an optimal design alternative based on the simulations.

19. The method of 17, further comprising:

importing product in use information from a physical system represented by the digital twin graph into the digital twin graph for use in the simulating of the system.

* * * * *